(12) United States Patent
Huang

(10) Patent No.: US 7,475,492 B1
(45) Date of Patent: Jan. 13, 2009

(54) STRUCTURE FOR END PIECE OF A TAPE RULE

(75) Inventor: Jason Huang, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 11/832,110

(22) Filed: Aug. 1, 2007

(51) Int. Cl.
*G01B 3/10* (2006.01)

(52) U.S. Cl. .............................. 33/758; 33/768; 33/770; 33/DIG. 1

(58) Field of Classification Search .................... 33/758, 33/755, DIG. 1, 759, 760, 768, 770
See application file for complete search history.

(56) References Cited

U.S. PATENT DOCUMENTS

| | | | | |
|---|---|---|---|---|
| 4,827,622 | A * | 5/1989 | Makar | 33/770 |
| 5,845,412 | A * | 12/1998 | Arcand | 33/758 |
| 6,070,338 | A * | 6/2000 | Garity | 33/760 |
| 6,511,112 | B2 * | 1/2003 | Schroeder | 33/758 |
| 6,546,644 | B2 * | 4/2003 | Poineau et al. | 33/758 |
| 6,568,099 | B2 * | 5/2003 | Bergeron | 33/770 |
| 6,874,245 | B2 * | 4/2005 | Liu | 33/758 |
| 7,124,515 | B2 * | 10/2006 | Juenemann | 33/758 |
| 7,240,439 | B2 * | 7/2007 | Critelli et al. | 33/758 |

* cited by examiner

*Primary Examiner*—Yaritza Guadalupe-McCall
(74) *Attorney, Agent, or Firm*—Lowe Hauptman Ham & Berner, LLP

(57) ABSTRACT

The present invention relates to an improvement of tape rule, in particular to end portion of the measuring tape which includes measuring tape connecting portion and hook hanging portion, both parts are made in same material as whole body. The surface of measuring tape connecting portion is formed with rivets. The hook hanging portion of measuring tape has at least 1 mm thickness, its surface contains holes with enough depth to enclose a magnetic object, the magnet's thickness does not exceed the depth of the holes; the surface of hook hanging portion is wrapped with a holding element covering its front surface, rear surface, and the magnetic object enclosed.

6 Claims, 9 Drawing Sheets

STRUCTURE FOR END PIECE OF A TAPE RULE

BACKGROUND OF THE INVENTION

1. Field of the Invention

The present invention relates to an improvement of tape rule, in particular to the hook plate of end piece of the measuring tape. A magnetic object is put inside the space formed of hook plate, and is wrapped by a holding element to cover the front and rear surfaces of the hook plate of hanging portion of the measuring tape.

2. Description of Prior Art

It is known to public that the tape rule is a motive and convenient measuring tool. As shown in FIG. 1, in general, the measuring tape 12 of connectional tape rule is reserved in a housing 11. At the end portion of the measuring tape 12, there is an end piece 13. Said end piece 13 contains a connecting plate 14 to be attached onto the end of the measuring tape 12, and a hook plate 15 perpendicularly extended from the connecting plate 14. In using the tape rule, by using the hook plate 15 of the end piece 13, it is merely necessary for people to pull the end piece 13 and then put the end piece 13 against the surface of an article or hook onto the end of the article to be measured.

However, said end piece 13 of tape rule has some disadvantages as follows:

In order to make the hook plate of the end piece be connected to the measuring tape as an entity, and to prevent inconvenience of carrying the tape rule due to the end piece, the area of hook plate is made as small as possible. However, if the area of hook is too small, it is difficult to hook onto an article and easy to slide away from the article to cause inaccurate measurement, to improve such problem happened in the end piece of conventional tape rules, U.S. Pat. No. 6,546,644 B2 discloses an end piece for attachment to the end of measuring tape. A cross curvature tape measure supports its own weight when it is extended horizontally and is held in an upright position. A perpendicular hook at the end of the measuring tape can be used to secure the end of the measuring tape to an edge of an object. A hook that extends above the curved surface of the measuring tape allows measurements to be secured from below an object while maintaining the upright and self supporting position of the tape. An adhering or magnetic means attached at the end of the measuring tape further assists in allowing measurements to be taken without causing the incidental collapse of the measuring tape. Such and end piece may be removably attached, and may be adapted to fit on existing tape measures. US Patent Application No. 2004/0064962A1 also discloses a soft stop-proof hook head of a measuring tape is located at one end of the measure tape and comprises a ruler hook. A surface of a ruler hook is enclosed by a soft elastomer. The soft elastomer is made of a flexible material. When the soft elastomer is pressed, it generates an elastic resistance; in measuring, the ruler hook is coupled to a measured bench mark of an object to be measured with a slide-stop effect. Moreover, the soft elastomer is extended with a slide piece for enhancing the slide-stop effect.

From the above two former applications, they all install magnetic object to front end of the end piece of measure tape, such that when the end piece is in contact with object made of metals, according to the magnetic nature of the end piece, the said object will be attached to the end piece of measuring tape. To increase the strength and stability of attachment are also designer and manufacturer's object of improvement.

However, the above mentioned structures are depend on magnetic object being installed to the front end surface of end piece, since only one side of magnetic object is attached by glue to end piece, the parts would fall apart easily due to the glue loss its adhesive effect after repeat contact in use; or because the magnetic piece of end piece is extruded outside the end piece, the parts are easily fall apart due to repeat contact in use. Furthermore, since objects to be measured can be in many different forms, not all object to be measured can be hooked by the hook plate of the end piece, therefore rely solely on the magnetic nature of the end piece to attach the object is insufficient.

In order to overcome the inconvenience of the design of the above cases, the inventor of present invention has experiment, conduct research and make improve of present invention to reach its final outcome.

SUMMARY OF THE INVENTION

It is an object of the present invention to provide an improved structure for the end piece of tape rule, that is to wrap the magnetic object together with the hook plate as a whole body.

According to the improved structure of the end piece of present invention, hook plate of the end piece has a caved-in space to embrace whole magnetic object, after the said magnet is put into the said caved-in space, then a holding element is used to cover the whole magnetic end piece.

According to the improved structure of the end piece of present invention, the holding element that is used to wrap the whole magnetic hook hanging portion of end piece has elastic nature and is slip preventing.

A more complete understanding of these and other features and advantages of the present invention will become apparent from a careful consideration of the following detailed description of preferred embodiments illustrated in the accompanying drawings.

BRIEF DESCRIPTIONS OF THE DRAWINGS

DETAILED DESCRIPTION OF THE PREFERRED EMBODIMENTS

Figure 1:
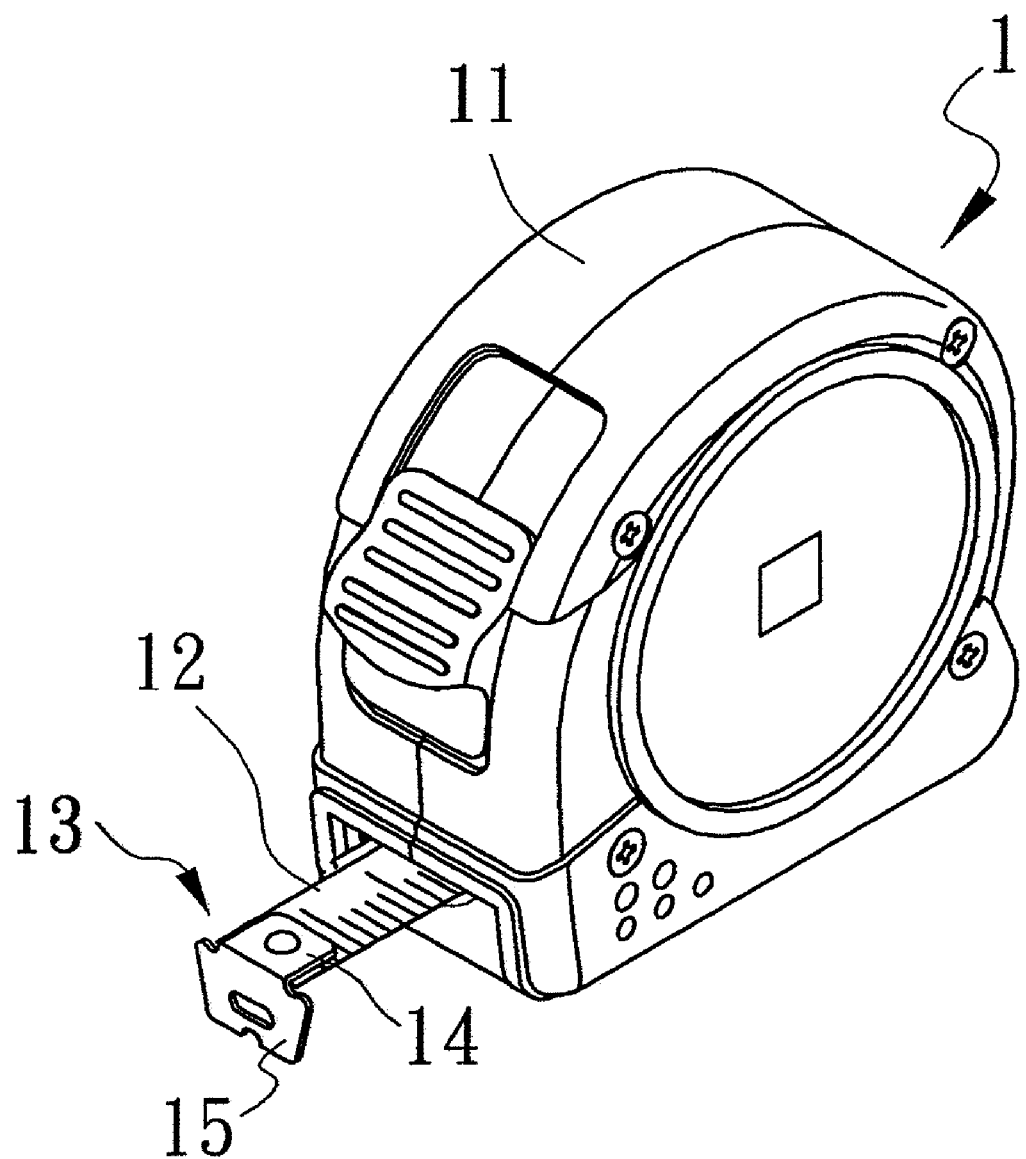
FIG. 1 is a perspective view of conventional tape rule.
Figure 2:
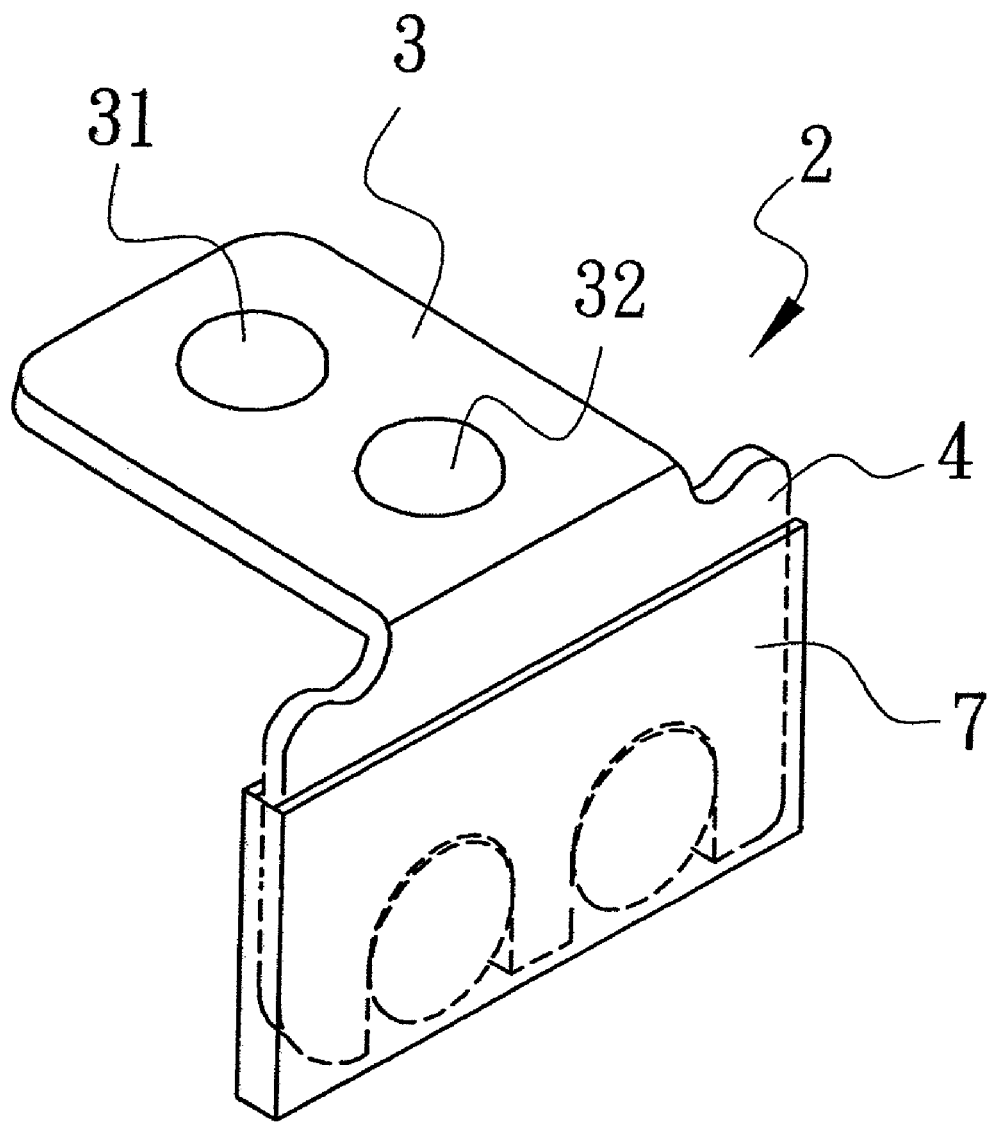
FIG. 2 is a perspective view showing the construction of the hook plate of the present invention.
Figure 3:
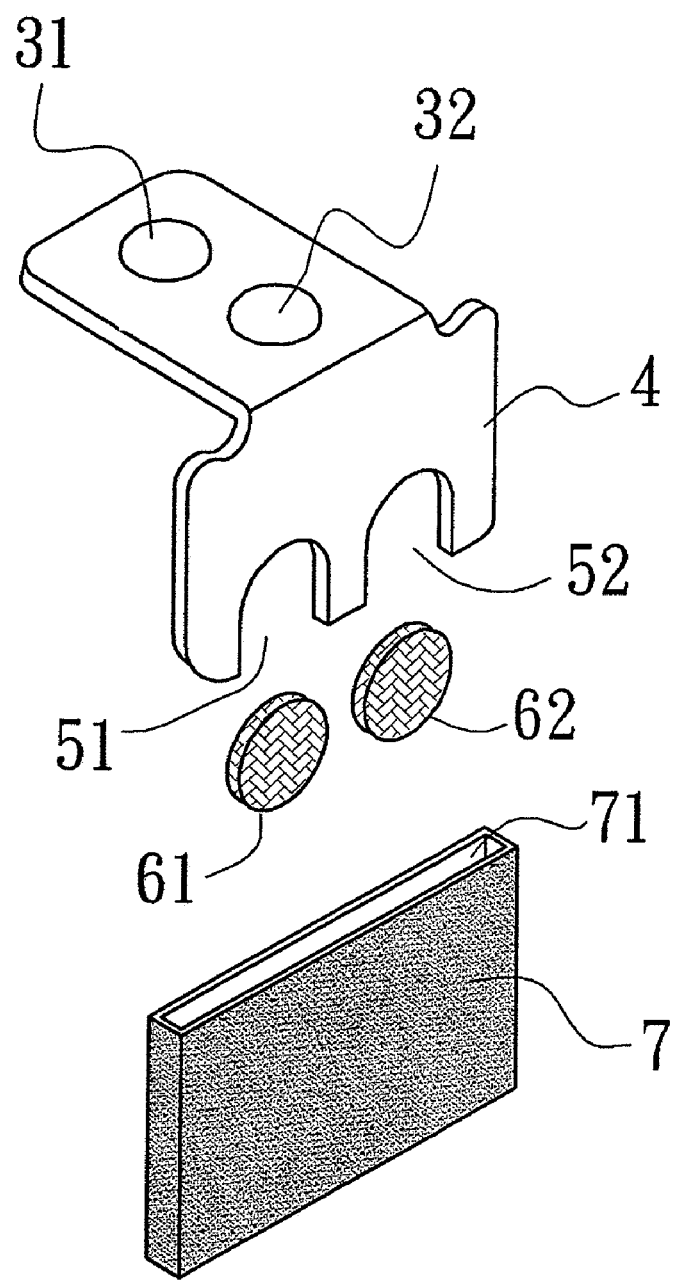
FIG. 3 is a exploded perspective view showing the construction of the hook plate of the present invention.

According to the improved structure for the end piece of the tape rule of the present invention, as shown in FIGS. 2 and 3, the end piece 2 includes a measuring tape connecting portion 3 and a hook plate 4. The measuring tape connecting portion 3 and the hook plate 4 are made by same material to form a whole body. There are pin holes 31, 32 for rivets to insert into and connect the end piece 2 to be firmly attached to the surface of measuring tape (the portion of tape rule denoted by 12 shown in FIG. 1).

The said hook plate 4 is connected to end of measuring tape connecting portion 3 and extend downward from the connecting plate, the hook plate 4 has two caved-in potholes 51, 52 and is cut from bottom towards center upwardly, the height of the potholes is large enough to take in the whole magnetic objects, the depth of the two potholes is the same as hook plate 4.

There are magnetic objects 61, 62 can be circular, rectangular or other shapes of plate, and the said magnetic objects are preferably formed as circular plate. The circular magnetic object's depth mainly do not exceed the depth of the said caved-in potholes 51, 52, and the size of magnets must not exceed the potholes, so the potholes can completely enclose the two magnets; in general, the said hook plate 4 has at least 1 mm thickness, and the depth of pothole is less than the thickness of hook plate, while the magnetic object's thickness is preferably designated between 0.5 mm-3 mm.

Said caved-in potholes 51, 52 on the hook plate can be formed as concaved grooves 51, 52 corresponding to the magnetic objects 61, 62, such that the magnetic objects 61, 62 can quickly inserted into said concaved grooves 51, 52 to form an entity of end piece having magnetic objects. In addition, inside the concaved grooves 51. 52, adhesive agent can be filled to increase the adhesive force between magnetic objects 61, 62 and the wall of concaved grooves 51, 52. There is a holding element 7 covering the magnetic object 61, 62 and hook hanging portion entirely as one piece and is wrapped upwardly from bottom of the hook plate 4 to enclose the hook plate 4 and magnetic object 61, 62.

Holding element 7 can be formed of a box having an opening, its size is designed to enable it to easily slip onto hook hanging portion 4 from bottom to cover its surface. The said holding element 7 is to be a thin coat by design, not exceed the thickness of magnetic object 61, 62, therefore, will not reduce the effectiveness of the magnetic object. One function of holding element 7 is for wrapping the magnetic object onto the hook hanging portion 4.

When the holding element is made of a box for entirely wrapping the magnetic objects and the hook plate, it covers both front surface and rear surface of the hook hanging portion, hence as the said holding element is made of elastic and slip preventing material (such as plastic), the elastic nature of the holding element, when contacts an article's surface, increases the resistance between the hook hanging portion and the article to be measured, so the article can be firmly hooked for obtaining an accurate measurement.

Figure 4:
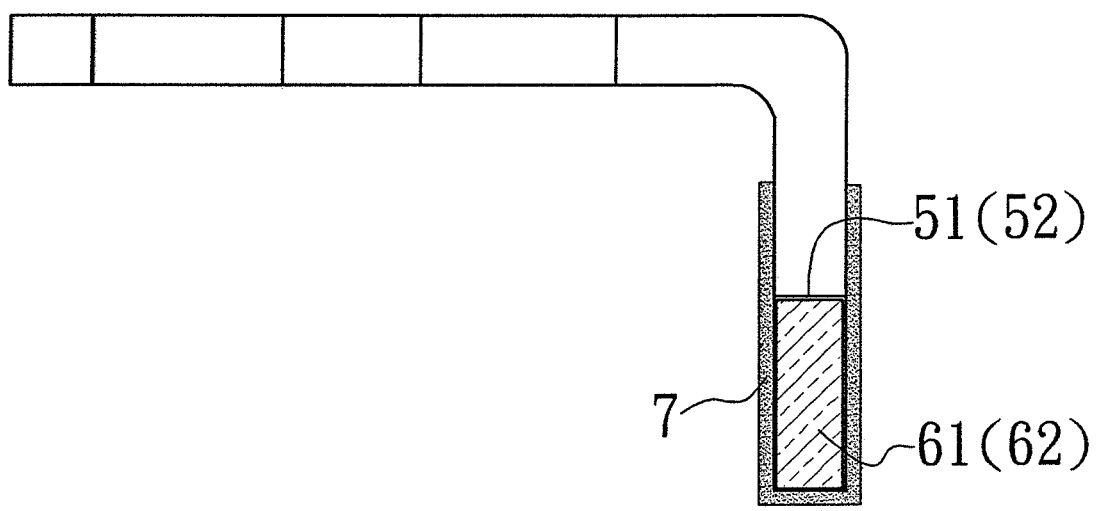
FIG. 4 is a cross-sectional view showing the construction of the hook plate of the present invention.

FIG. 4 of present invention discloses a holding element 7 that covers the outside of hook hanging portion where two magnets 61, 62 are enclosed in. Since the magnets are made the same size and depth as the caved-in potholes 51, 52, therefore the magnet 61, 62 is maximized in the pothole 51, 52 to reach its top performance. While the magnets are enclosed in the said holding element 7, they are not exposed to the air, therefore the problem of magnets fall off from hook hanging portion 4 of end piece 2 is solved.

Figure 5:
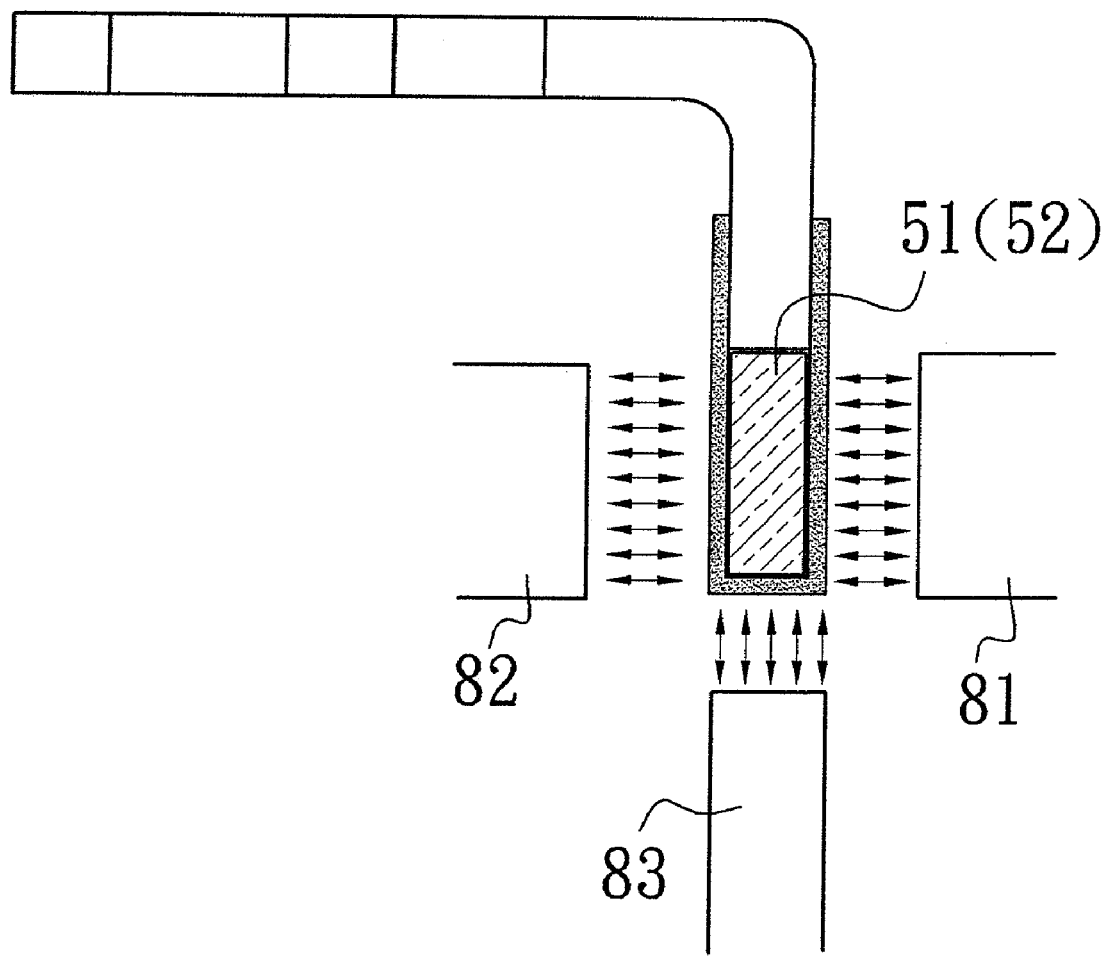
FIG. 5 is a view of magnetic nature under the construction of the hook plate of the present invention.

According to the FIG. 5 of present invention, because magnets 61, 62 are put in the caved-in potholes 51, 52, its magnetic nature would not be reduced by the material and thickness of the hook hanging portion, hence the magnets 61, 62 can attract article placed in front, at the back or below the said hook plate 4, and its magnetic nature will not be limited by the form of article to be measured.

Figure 6:
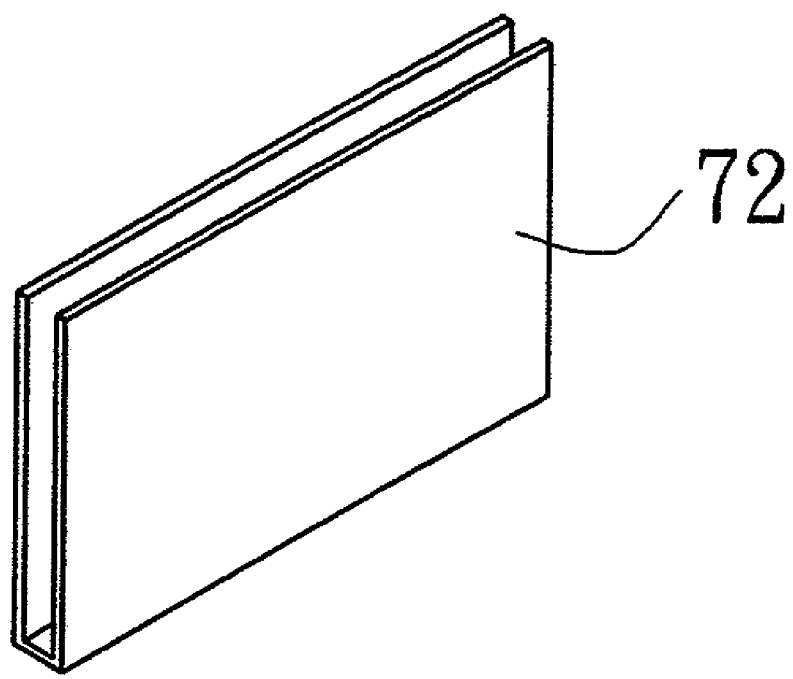
FIG. 6 is an optional view 2 of the construction of the hook plate of the present invention.

According to the FIG. 6 of present invention, the holding element can not only designed to have an opening, it can also be U-shape. The U-shape holding element 72 covers the front, back and bottom of hook plate 4, and the magnetic nature of magnets 61, 62 enclosed will not be reduced by its cover.

Figure 7:
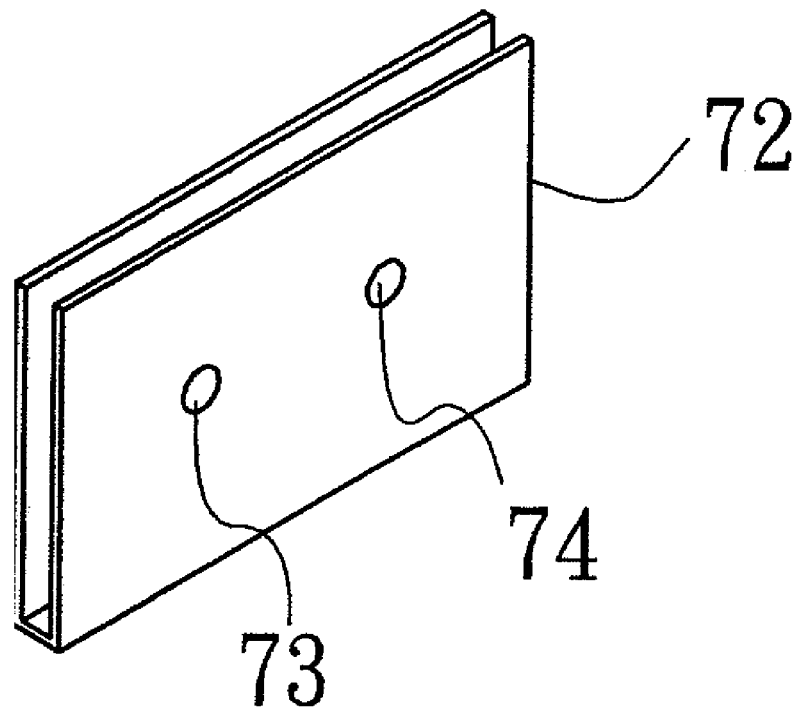
FIG. 7 is an optional view 3 of the construction of the hook plate of the present invention.

According to the FIG. 7 of present invention, in order to increase the usability of holding element 72, small holes 73, 74 are formed on the holding element 72 and the corresponding spot of the magnetic objects 61, 62, such that both the concealler and the magnets can be fixated easily during assembling.

Figure 8:
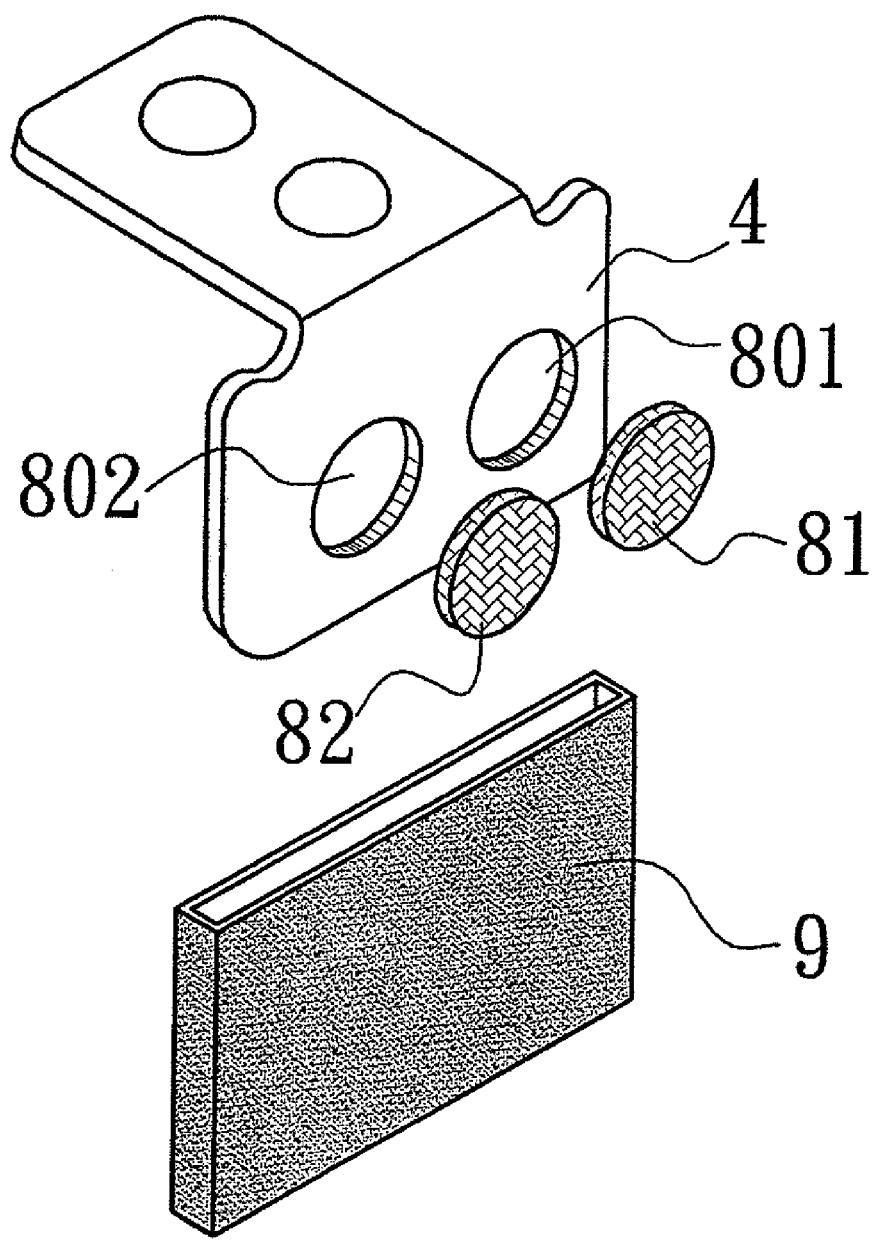
FIG. 8 is an optional view 4 of the construction of the hook plate of the present invention.

According to FIG. 8 of present invention, in order to connect magnets 81, 82 and hook plate 4, two holes 801, 802 are formed on the hook plate 4, then the magnetic objects 81, 82 are put into the holes 801, 802 to form a whole body. Finally, the magnetic objects 81, 82 and hook plate 4 are enveloped with holding element 91.

Figure 9:
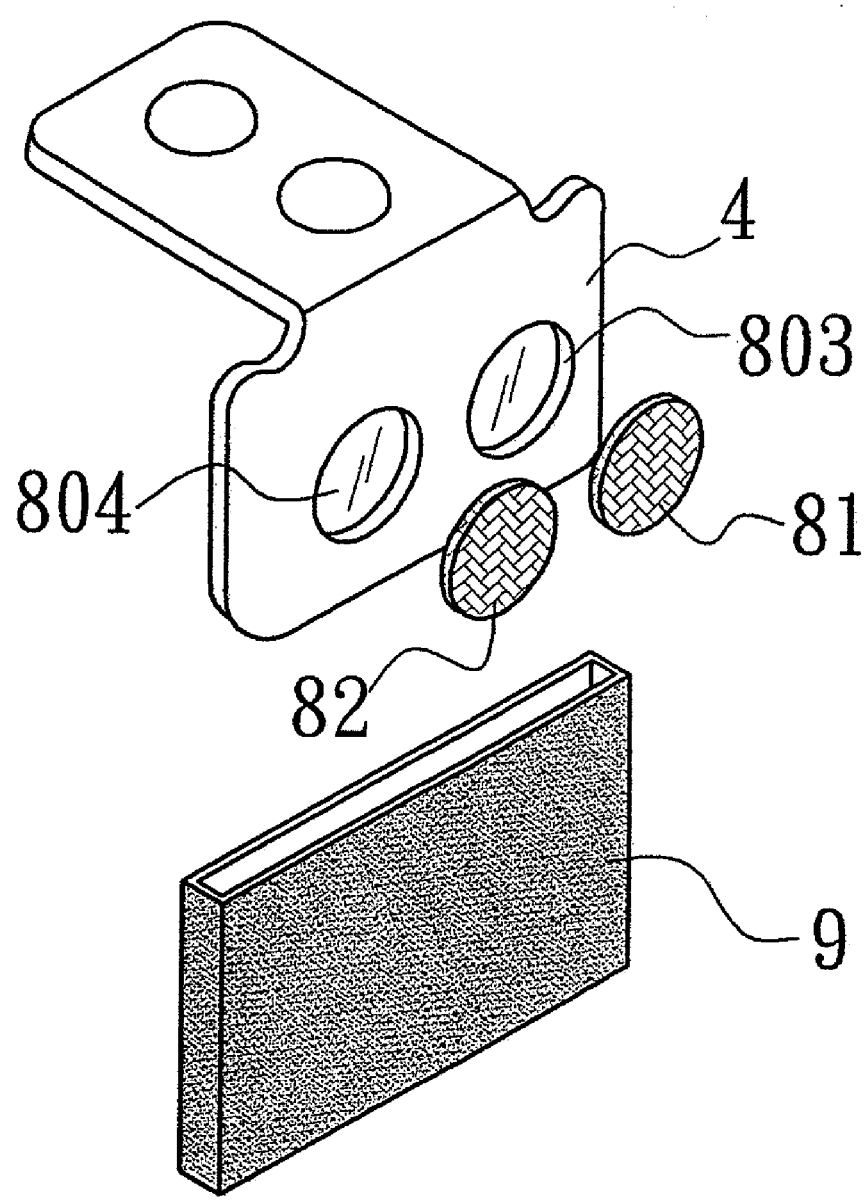
FIG. 9 is an optional view 5 of the construction of the hook plate of the present invention.

According to FIG. 9 of present invention, another embodiment to connect hook plate 4 and magnetic objects 81, 82 is to have two grooves 803, 804 on hook plate 4, then put the magnetic objects 81, 82 into the grooves 803, 804 to make the hook plate an entity. Finally envelope the magnetic objects 81, 82 and hook plate 4 with holding element 81.

According to the improved structure for the end piece of the tape rule of the present invention, hook plate is attached to magnetic object and the whole body is covered by elastic concealler, this particular design can prevent the parts from fall apart due to incorrectly external force, also able metal object to be attached to hook hanging portion's front surface, back surface, and bottom. Since present invention is not disclosed and for sale previously, thus believed present invention is an invention of novelty.

Although the present invention has been described with a certain degree of particularity, the present disclosure has been made by way of example and changes in details of structure may be made without departing from the spirit thereof.

What is claimed is:
1. An improved structure for an end piece of a tape rule, said end piece comprising:
   a measuring tape connecting portion connected horizontally to the end of the measuring tape so that the end piece is connected to the measuring tape as one piece;
   a hook plate, placed at the end of the end piece, perpendicularly extended downwardly from the tape connect- ing portion; so that an article for measurement can be hooked by the hook plate, so a measurement can be made;

two magnetic objects and, said hook plate containing two spaces for receiving the two magnetic objects therein, and a holding element disposed outside of the hook plate for holding the two magnetic objects onto the hook plate;

wherein the said magnetic objects are between 0.5 mm-3 mm in thickness; and wherein said holding element is formed as a box having an opening on one side thereof.

2. The improved structure for an end piece of a tape rule as claimed in claim 1, wherein the thickness of said holding element is less than the thickness of the hook plate and the magnetic objects.

3. The improved structure for an end piece of a tape rule as claimed in claim 1, wherein the said holding element contains two small holes, aligned with said magnet objects.

4. The improved structure for an end piece of a tape rule as claimed in claim 1, wherein the space for holding magnets formed on said hook plate is extended from outside to inside of the hook plate.

5. The improved structure for an end piece of a tape rule as claimed in claim 1, wherein the space for holding objects formed on said hook plate is at least two holes formed in the hook plate.

6. The improved structure for an end piece of a tape rule as claimed in claim 1, wherein the said holding element is made of a slip preventing material.

* * * * *